3,209,809
BURNER INSTALLATION CONTROLLED
BY A FLAME DETECTOR
Egon Nielsen and Gunnar Olsen, Nordborg, Denmark, assignors to Danfoss ved ing. M. Clausen, Nordborg, Denmark, a company of Denmark
Filed Sept. 11, 1962, Ser. No. 222,797
Claims priority, application Germany, Sept. 11, 1961, D 37,003
11 Claims. (Cl. 158—28)

This invention relates to a burner installation, controlled by a flame detector, and is more particularly concerned with an oil-burner installation having an electric motor for feeding fuel and an ignition device, with a safety switch for switching off the system if the flame does not ignite.

In known installations, the ignition device usually operates for a certain time long after the motor starts. It is switched off as soon as the flame detector supplies an appropriate switching signal. If such a signal does not come after a certain safety period, the safety switch starts functioning and switches off the entire system. Normally, there is a motor protection switch provided for the motor. This switch is provided to protect the motor from thermal overload. This switch, therefore, cuts off the supply of current to the motor if there is too great a current flow during a certain protection period. In the case of a single-phase motor with a starting winding, both overloading of the operating winding and overloading of the starting winding have to be controlled. Heretofore, the motor protection switch and the previously-mentioned safety switch have been built as two switching elements which are completely separate from each other.

It is an object of this invention to provide a simplified, more compact, yet fully effective system to insure all needed protection features in a burner installation of the character indicated.

In accordance with the invention, the circuitry is simplified and important cost reductions are achieved by providing a system in which the safety switch is also utilized as a motor protection switch during the starting and operating periods.

Only a single switch is used, therefore, to respond to various malfunction factors, all leading to the switching off of the installation. A particular advantage of the system of the invention is, furthermore, that the locking device, which is commonly used with a safety switch and which permits reactivation to be effected only manually, can also be utilized for malfunctions in the motor. It is impossible, therefore, for the motor to attempt several consecutive starts, leading again and again to a thermal overload.

The combining of a safety switch and a motor protection switch leads, however, to the difficulty that there are different permissible time periods for the various malfunctions to which the combined switch has to respond. The safety period, for instance, during which ignitions may be attempted, is considerably longer than the period after which the motor has to be shut off because of its failure to start. Thus, in contrast to a safety period of 20 to 25 seconds in the case of a photo-electric control organ, or of 40 to 50 seconds in the case of a bimetallic control organ, the period after which the motor must be deenergized is only a few seconds, e.g., five seconds.

It is a particular feature of this invention that this problem can be readily solved by having the activating member of the safety switch so related to the system that it is influenced not only by the characteristic value determining the safety time of the ignition device but also by a further characteristic value which determines the protection time for the motor. The safety switch may consist, most advantageously, of a bimetal switch that can be heated by two or more heating effects, one of which is correlated to the safety time of the ignition device and the other to the motor protection time.

In a basic embodiment of such a system there are provided at least two different heating elements, one of which is correlated to the safety time of the ignition device and the other to the motor protection time. There is no difficulty in proportioning the heating elements in such manner that for different malfunctions different cut-off times will be maintained.

Another embodiment involves the provision of at least two different heating elements in the circuit of the motor, one of which will be made inactive when the flame ignites. In this case, therefore, the heating effect is supplied by the motor current. The various times result, on the one hand, from a change in this motor current and, on the other hand, from a variation in the total action of the interconnected heating elements.

In this case, both heating elements are preferably connected in series and one of them is short-circuited when the flame ignites. It is advantageous to have both heating elements consist of one heating filament with a tap.

In many installations a motor with a resistance starting winding is used. Here there is the added problem of also controlling malfunctions in the starting winding. A control of the starting winding is of particular importance because the current in the starting winding is relatively strong and remains constant because of the ohmic character of the starting winding.

According to a further feature of the invention, however, the starting winding can be made disconnectible by utilizing the elements contained in the combined safety-motor protection-switch for controlling the ignition device and the operating winding of the motor.

In one embodiment, for example, the starting winding is connected in parallel with the ignition device. In this case, the time after which the starting winding is disconnected equals the safety time established for the ignition device. This circuitry may be employed for motors which, with the starting winding under load, do not heat up very fast.

In another embodiment for the protection of the starting winding, one of the heating elements is contained in the common power supply line to the operating and starting windings. The heating element which is responsible—partly, at least—for switching off when there is too high a current in the operating winding, is in this system also responsible for switching off when there is an overload in the starting winding.

It is possible, also, to have the starting winding switched on and off by the switch of a starting relay if the current to the operating winding is led through the coil of the relay. If this circuit alone is used, the starting winding will normally stay switched on only for a short time, viz. as long as the motor is accelerating, therefore approximately 0.3 second. Should the starting winding stay switched on for a longer period, the current in the operating winding and, therefore, in the heating elements belonging to it, will be above the normal value, so that the combination safety-motor protection-switch will effect a rapid switching off. This starting relay, however, may also be used, in combination with the other above-mentioned protective system, for the starting winding. The use of a starting relay makes it possible, in any case, to use the somewhat more sluggish bimetal heat sensor instead of a photo-electric flame detector, even if the contact which is activated by this sensor lies in the current feed line leading to the starting winding.

Bimetal heat sensors are considerably cheaper than photo-electric flame detectors but they have a response delay which, in the most favorable case, is 20 seconds.

When a photo-electric detector is used in combination with the starting relay, the recommended ratio between the feed voltage of the circuit, to which the photo-relay responds, and the feed voltage to which the starting relay responds is one or less than one. The voltage stabilization device for the photo relay, which is otherwise usual, is then unnecessary. It is impossible, furthermore, for the motor to start and to feed oil into the burner chamber unless the photo relay indicates a flame.

Further characteristics of the invention will be apparent from the following detailed description of several embodiments taken in connection with the accompanying drawings wherein FIG. 1 is a circuit diagram of a first embodiment of the invention;

Figure 1:
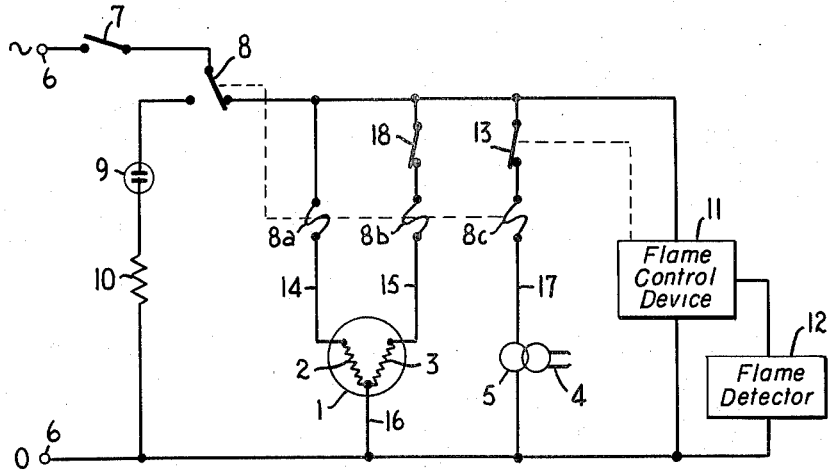

All of the figures show circuit diagrams for burners with a single-phase motor 1, which has an operating winding 2 and a resistance starting winding 3, and an ignition device 4, the latter being connected through a transformer 5. The circuit is connected by its terminals 6 to a single-phase feeding voltage. In the current feed line is the boiler thermostat 7 and the safety switch 8 comprising a bimetallic element. In response to the safety switch, the lamp 9, in a line including the resistance 10, lights up to indicate the malfunction. At the same time, the current to the remainder of the circuit is cut off. A flame control device 11 with a flame detector 12 serves, upon the occurrence of a flame, at least to open the switch 13 (FIGS. 1 to 3) or switch 13′ (FIG. 4) in the line to the ignition transformer 5.

In FIG. 1, the safety switch 8 has three heating elements 8a, 8b, 8c. The heating element 8a is in the line 14 leading to the operating winding 2 of the motor. Heating element 8b is in the line 15 leading to the starting winding 3 of the motor, with the operating winding and the starting winding having a common return line 16, and the heating element 8c lies in the line 17 leading to the ignition transformer 5. There is, furthermore, a switch 18, in line 15 leading to the starting winding 3, which may be a centrifugal switch, for example. If the boiler thermostat 7 is closed because of a heat requirement, current will flow to the operating winding 2, to the starting winding 3 and to the ignition transformer 5. Under normal circumstances, the motor will start, the centrifugal switch 18 will switch off starting winding 3, and the ignition device will continually attempt to ignite the fuel. As soon as a flame appears, the switch 13 in the line to ignition transformer 5 is opened by means of the control device 11. The heating elements 8a, 8b and 8c are influenced by the currents going through lines 14, 15 and 17. Under normal conditions, the heat will not be sufficient to activate the safety switch 8. If the motor is blocked, there will be a short-circuit current in the operating winding 2 and thereby in the heating element 8a. At the same time, the current for the starting winding will flow through the heating element 8b and the current for the ignition transformer will flow through the heating element 8c. The heating effect of all three elements will cause a relatively rapid switching of the safety switch 8 within the so-called protection time. If the motor should start without the current in the starting winding being cut off, for example because the centrifugal switch 18 did not open, a relatively strong current (of the magnitude of the short-circuit current of the operating winding) will flow through the heating element 8b for a rather long time. Furthermore, the heating element 8a will be heated by the normal operating current and heating element 8c by the ignition current. The total of this heating will be sufficient to switch off the safety switch 8 within a certain time, although this time does not have to be identical with the above-mentioned protection time. If the motor has started properly, but ignition has not been effected, there will be the normal operating current in the heating element 8a and the ignition current in heating element 8c. The consequence of both heating effects is that the safety switch 8 will switch off after a somewhat longer period, the so-called safety time of about 20, or even 50, seconds. It can be seen from the above that it is possible to break the current faster or less fast, according to the malfunction or the combination of malfunctions. The more the motor is adversely affected, the faster is the switch operation.

Figure 2:
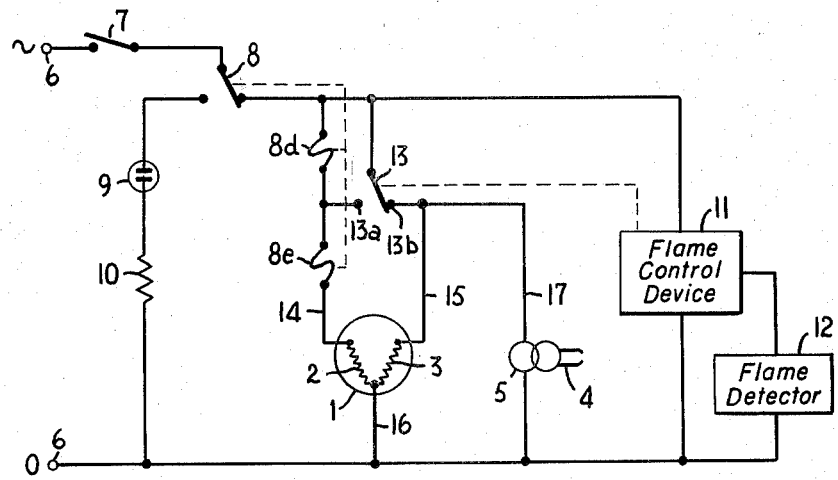
FIG. 2 is a corresponding circuit diagram for a second embodiment.

FIG. 2 shows a more basic embodiment of the invention. The two heating elements 8d and 8e are connected in series and are in the line 14 leading to the operating winding of the motor. Both heating elements together can form a single heating filament with a tap. The part 8d of the filament can be bridged by the switch 13 which, in its normal position, supplies current to both the ignition transformer 5 and the starting winding 3.

If the boiler thermostat 7 is switched on, current is supplied to the operating winding 2 through the heating elements 8d and 8e and to the starting winding 3 and to the ignition transformer 5 through switch 13.

The current for the operating winding flows through the heating elements 8d and 8e of the safety switch 8, but within approximately 0.3 second it is reduced from its short-circuit value to the normal operating value, so that the combination safety-motor protection-switch can not respond. The ignition transformer 5 is under voltage and ignites the flame. As soon as the flame appears, the control device 11 actuates the switch 13 from its position 13b into its other position 13a, which normally happens within not more than 5 seconds, so that the motor does not adversely heat up. At this moment, the part 8d of the filament winding will be short-circuited so that only the filament part 8e carries the simple operating current, which is not sufficient to obtain a response from the safety switch 8. In the event, however, the motor is blocked, or in the event the switch 13 is in position 13a because of a false exposure to light, the starting winding 3 will not be supplied with current and the full short-circuit current will flow through the filament part 8e, so that the safety switch 8 will switch over very rapidly, i.e. within the protection time. In case the motor starts normally but the ignition is not effected, the switch 13 will remain in its position 13b. In this case, the heating effect of the two filament parts 8d and 8e through which the operating current flows is sufficient to throw the safety switch 8 within a somewhat longer time period, viz. the so-called safety time.

Figure 3:
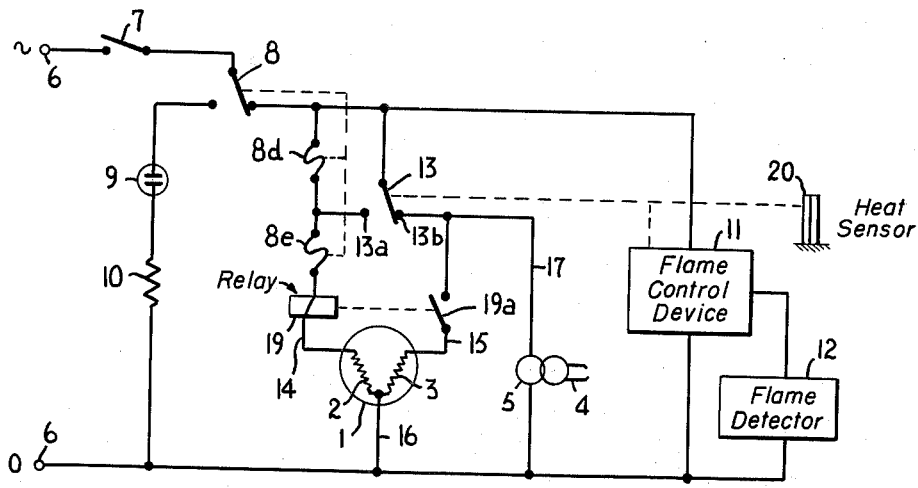
FIG. 3 is a like circuit diagram for a third embodiment.

FIG. 3 shows a circuit which, except for some differences, corresponds to FIG. 2. These changes make it possible to use even very sluggish activating elements in switch 13, e.g. a bimetal sensor 20, with a reaction time of not better than 20 seconds, instead of the photo-electric sensor 12, which has an instantaneous reaction upon the appearance of the flame. The reason for the sluggish action of the bimetal sensor is that the flame has first to heat the air in the boiler and the air then has to heat the bimetal before the switch 13 will respond. When the heat sensor 20 is thus so slow, it is necessary to select a much longer safety time for the ignition device. It is difficult, considering such a long time period, to protect the starting winding 3 with a circuit according to FIG. 2 because, even with the shortest possible response time of the bimetal sensor, the starting winding 3 would already have reached such a high temperature that it would endanger the motor. In the circuit according to FIG. 3, however, this danger is eliminated by inserting the coil of a common starting relay 19 in the line 14 leading to the operating winding 2, and the switch 19a in line 15 which leads to the starting winding 3. The relay responds only if line 14 carries a considerably stronger current than the operating current. But, if the motor starts properly, the current falls within approximately 0.3 second to its normal operating value and switch 19a is opened. A load upon the starting winding 3 would be possible only in case relay 19 receives a correspondingly high starting current. This current, however, also flows through the heating elements 8d and 8e, or at least through element 8e alone, so that switch 8 will switch over after a relatively short protection time, which is considerably shorter than the safety time. The malfunction of the starting winding corresponds to the short-circuiting of the operating winding. It is thus now possible to choose the safety time independently of the starting winding and to establish much higher values for it, such as 50 seconds. But this also means that it is possible to use motors with a starting winding that can stand only a relatively short activation period. The above-mentioned malfunctions are only some of those which might occur and to which the circuit would react.

Figure 4:
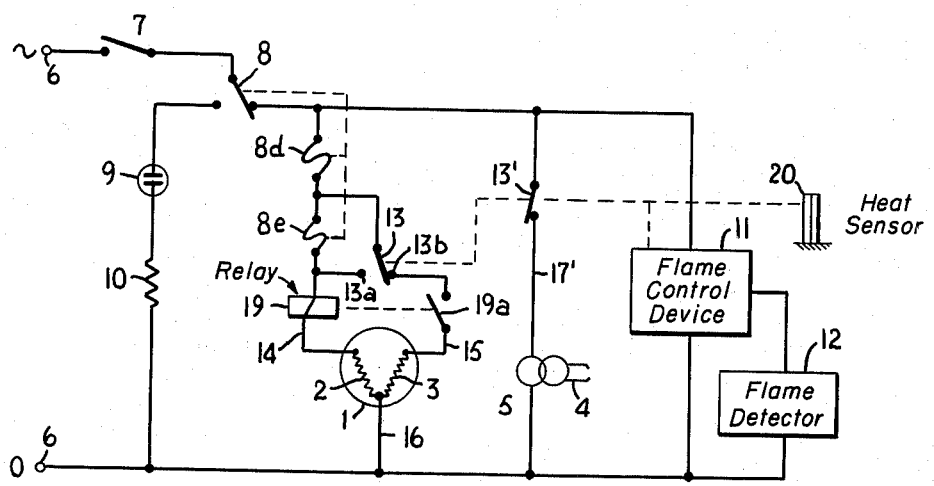
FIG. 4 is a further circuit diagram which is suitable for a fourth embodiment of the invention.

In FIG. 4, the heating resistance 8e carrying the current flowing to the operating winding 2 is in the line between the safety switch 8 and the branch leading to switch 13. In this case, the ignition transformer 5 is in a special line 17′ with its own switch 13′. As in the previous cases, the switches 13 and 13′ are activated by the photo relay 12 or the bimetal sensor 20.

In this manner both the current to the operating winding 2 and the current to the starting winding 3 flow through the heating element 8d. Thus, the same cut-off possibilities are obtained as in the previous cases. However, if the starting winding is carrying a current which is not permissible, the cutoff occurs considerably faster than in the embodiment of FIG. 3. There is, furthermore, an increased safety factor because even if the relay switch 19a should fuse and become welded, there will be no damage, and the safety switch 8 will switch off, since the current to the starting winding 3 is so strong that it will give a very strong heating effect in the heating filament 8d in addition to that caused by the operating current.

A simplification of this circuit can be obtained by inserting the heating element 8e in the return wire 16. In such a case, it is possible to eliminate the additional switch 13′ so that there will be a circuit such as in FIG. 3 except for the fact that the heating element 8e will be provided in the return line instead of in the feed line 14.

The circuits, according to FIGS. 3 and 4, contain a starting relay 19. Advantageously, this starting relay is correlated with the photo relay 12 in such manner that the ratio between the feeding voltage of the circuit at which the photo relay responds and the feeding voltage at which the starting relay responds is one or less than one. With this arrangement, there is assurance that the starting relay will not be actuated at a low voltage and cause the motor to start, even though the photo relay is not at all in a position to indicate a flame. Such a provision is advantageous because, as is well known, a motor is able to start even at a fraction of its nominal voltage. It is unnecessary to have a voltage stabilization of the photo relay, because the installation does not start operating if the voltage is too low.

The above-described embodiments demonstrate how the invention makes possible the provision of a circuit which, although free from the complexities of known systems, takes into account all conditions of malfunction which may possibly arise. All deenergizations because of malfunctions are effected by the single switch 8 and yet each malfunction condition is acted upon in relation to its own cutoff time period, depending upon the operation involved. The system of the invention has the further special advantage that the de-energization or switching off is effected even faster if several malfunctions occur at the same time.

It will, of course, be understood that the several individual components of the systems described and illustrated, e.g. the various switches such as the safety switch 8, and the switches 13 and 18, the heating elements, the ignition transformer 5, the relay 19, the control device 11 with its flame detector 12, the bimetal sensor 20, and the like, are suitably of conventional construction, unless otherwise indicated. A typical safety switch is described, for example in U.S. Patent 2,895,028. A typical centrifugal switch is described in Electrical Manufacturing, March 1957, pages 170–171 and switch relays are described in U.S. Patent 2,727,568. Control devices and flame detectors are similarly described in U.S. Patent 2,304,641, U.S. Patent 2,727,568. Heating elements are described in U.S. Patent 2,727,568.

In general, the present invention represents improvements in conventional systems such as described in U.S. Patent 2,727,568.

It will be understood, furthermore, that various changes and modifications may be made in the embodiments described above and illustrated in the drawings and it is intended, therefore, that all matter contained in the foregoing description and in the drawings shall be interpreted as illustrative only and not as limitative of the invention.

What we claim and desire to secure by Letters Patent is:

1. A burner installation comprising an electric motor for feeding fuel to a burner, an ignition device, a flame detector, a circuit for supplying current to said motor, said ignition device, and said flame detector, and a safety switch including contact means for closing said circuit, and two actuating means for opening said contact means, the first of said actuating means being connected in circuit with said motor so as to be responsive to motor current and being adapted to cause said contact means to open upon a predetermined malfunction of said motor, and the second of said actuating means being governed by the reaction of said flame detector with respect to said ignition device and adapted to cause said contact means to open upon a predetermined malfunction of said ignition device.

2. A burner installation comprising an electric motor for feeding fuel to a burner, an ignition device, a flame detector, a circuit for supplying current to said motor, said ignition device, and said flame detector, and a safety switch including a bimetallic contact element for closing said circuit and two heating elements arranged in heating relation to said bimetallic contact element, the first of said heating elements being connected in circuit with said motor so as to be responsive to motor current and being adapted to cause said bimetallic contact element to open upon a predetermined malfunction of said motor, and the second of said heating elements being governed by the reaction of said flame detector with respect to said ignition device and being adapted to cause said bimetallic contact element to open upon a predetermined malfunction of said ignition device.

3. A burner installation as defined in claim 2, wherein said motor includes a starting winding and an operating winding and wherein a third heating element is connected in circuit with said starting winding and said first heating element is connected in circuit with said operating winding whereby said bimetallic contact element is caused to open by a mal-function in either winding individually and by the cumulative effect of mal-functions in both of said windings.

4. A burner installation as defined in claim 3, wherein speed responsive switch means is provided for deenergizing said starting winding when said motor has started.

5. A burner installation as defined in claim 3, wherein said starting winding is connected in parallel with the ignition device.

6. A burner installation as defined in claim 2, wherein said two heating elements are connected in circuit with said motor and wherein means responsive to said flame detector is provided to render said second heating element inactive when the fuel has been ignited.

7. A burner installation as defined in claim 6, wherein said two heating elements are connected in series and wherein said means for rendering said second heating element inactive comprises means for short-circuiting said second heating element when the fuel has been ignited.

8. A burner installation as defined in claim 7, wherein said two heating elements comprise one heating filament with an intermediate tap.

9. A burner installation as defined in claim 6, wherein said motor includes a starting winding and an operating winding and wherein said first heating element is connected in circuit with said starting winding and said second heating element is connected in circuit with said operating winding.

10. A burner installation as defined in claim 9, wherein said first heating element is connected in a common feed line to said operating and starting windings.

11. A burner installation as defined in claim 9, which includes a starting relay comprising a switch for selectively connecting and disconnecting the starting winding and a coil in the feed line to the operating winding.

References Cited by the Examiner
UNITED STATES PATENTS

| | | | |
|---|---|---|---|
| 1,963,771 | 6/34 | Ballard | 158—28 |
| 2,077,294 | 4/37 | White | 158—28 |
| 2,180,580 | 11/39 | Clark | 158—28 |
| 2,210,853 | 8/40 | Falkenberg | 158—28 |
| 2,384,372 | 9/45 | Eaton | 158—28 X |

FREDERICK L. MATTESON, JR., *Primary Examiner.*

JAMES W. WESTHAVER, *Examiner.*